United States Patent
Lavi (10) Patent No.: US 10,356,616 B2
(45) Date of Patent: Jul. 16, 2019

(54) IDENTIFYING EXTERNAL DEVICES USING A WIRELESS NETWORK ASSOCIATED WITH A VEHICLE

(71) Applicant: GM Global Technology Operations LLC, Detroit, MI (US)

(72) Inventor: Nadav Lavi, Ramat-Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 15/432,520

(22) Filed: Feb. 14, 2017

(65) Prior Publication Data

US 2018/0234844 A1 Aug. 16, 2018

(51) Int. Cl.
*H04W 12/06* (2009.01)
*H04W 12/08* (2009.01)
*H04W 4/48* (2018.01)
*H04W 84/12* (2009.01)

(52) U.S. Cl.
CPC ............. *H04W 12/06* (2013.01); *H04W 4/48* (2018.02); *H04W 12/08* (2013.01); *H04W 84/12* (2013.01)

(58) Field of Classification Search
CPC ..... H04W 12/06; H04W 12/08; H04W 84/12; H04L 63/08
USPC .......................................................... 726/4
See application file for complete search history.

(56) References Cited

U.S. PATENT DOCUMENTS

| | | | | |
|---|---|---|---|---|
| 9,621,941 B2* | 4/2017 | Lemmey | .......... | H04N 21/41422 |
| 9,907,086 B2* | 2/2018 | Bai | ....................... | H04W 4/027 |
| 2004/0003252 A1* | 1/2004 | Dabbish | .................. | B60R 25/04 713/175 |
| 2005/0086504 A1* | 4/2005 | You | ..................... | H04L 63/0435 713/193 |
| 2008/0169938 A1* | 7/2008 | Madau | ...................... | B60R 1/00 340/901 |
| 2011/0115026 A1* | 5/2011 | Jagannathan | ..... | H01L 21/28176 257/369 |
| 2013/0023262 A1* | 1/2013 | Zhang | .................. | H04W 48/18 455/418 |
| 2015/0257176 A1* | 9/2015 | Vyas | ..................... | H04W 76/40 370/338 |
| 2016/0269356 A1* | 9/2016 | Basnayake | .......... | H04L 61/2015 |
| 2016/0330229 A1* | 11/2016 | Watson | ............... | H04L 63/1433 |
| 2017/0301237 A1* | 10/2017 | MacNeille | ............. | H04W 4/70 |
| 2018/0213574 A1* | 7/2018 | Bareket | .................. | H04L 43/12 |

* cited by examiner

*Primary Examiner* — Abu S Sholeman
(74) *Attorney, Agent, or Firm* — Cantor Colburn LLP (57) ABSTRACT

Examples of techniques for identifying external devices using a wireless network associated with a vehicle are disclosed. In one example implementation, a method includes initializing, by a processing system, an unsecure wireless network identified by a service set identifier (SSID). The method further includes receiving, by the processing system, a safety message from an external device external to a vehicle. The method further includes processing, by the processing system, the safety message to determine a location and a movement vector of the external device without performing a dynamic internet protocol address allocation to the external device. The method further includes alerting, by the processing system, an operator of the vehicle of the location and the movement vector of the external device.

17 Claims, 4 Drawing Sheets

IDENTIFYING EXTERNAL DEVICES USING A WIRELESS NETWORK ASSOCIATED WITH A VEHICLE

INTRODUCTION

The present disclosure relates to identifying external devices using a wireless network associated with a vehicle.

A vehicle, such a car, motorcycle, a boat, or any other type of automobile may be equipped with an in-vehicle network device for providing a wireless network. The in-vehicle network device provides networking capabilities to passengers of the vehicle and may, in examples, provide Internet connectivity via a cellular connection. For example, a user may connect his device (e.g., a laptop, a smartphone, a wearable computer, etc.) to the vehicle network. Accordingly, the device is enabled to communicate with other devices and/or to access Internet content from the vehicle. This may enable the user's device to access content on an in-vehicle infotainment system, for example.

SUMMARY

In one exemplary embodiment, a computer-implemented method for identifying external devices using a wireless network associated with a vehicle includes initializing, by a processing system, an unsecure wireless network identified by a service set identifier SSID. The method further includes receiving, by the processing system, a safety message from an external device external to a vehicle. The method further includes processing, by the processing system, the safety message to determine a location and a movement vector of the external device without performing a dynamic internet protocol address allocation to the external device. The method further includes alerting, by the processing system, an operator of the vehicle of the location and the movement vector of the external device.

In an example, the SSID is a first SSID, and the method may additionally include initializing, by the processing system, a secure wireless network identified by a second SSID, and receiving, by the processing system, an authentication request from a user device to access the secure wireless network. An example method may additionally include dynamically allocating, by the processing system, an internet protocol address to the user device to enable the user device to communicate via the secure network. In some example methods, the safety message is a first safety message and the location is a first location, the method further including receiving, by the processing system, a second safety message from the external device external to the vehicle; and processing, by the processing system, the second safety message to determine a second location of the external device without performing a dynamic internet protocol address allocation to the external device. An example method may additionally include alerting, by the processing system, the operator of the vehicle of the second location of the external device. An example method may additionally include identifying a message as a safety message prior to processing the safety message. In some example methods, the message is identified as a safety message based on at least one of a format of the message, a packet header of the message, a port on which the message was received, or a size of the message. In some example methods, the safety message comprises an external device identifier. An example method may additionally include authenticating the safety message using an authentication key generated by an authentication authority.

In another exemplary embodiment, a system for identifying external devices using a wireless network associated with a vehicle includes a memory comprising computer readable instructions and a processing device for executing the computer readable instructions for performing a method. In examples, the method includes initializing, by a processing system, an unsecure wireless network identified by a service set identifier (SSID). The method further includes receiving, by the processing system, a safety message from an external device external to a vehicle. The method further includes processing, by the processing system, the safety message to determine a location and a movement vector of the external device without performing a dynamic internet protocol address allocation to the external device. The method further includes alerting, by the processing system, an operator of the vehicle of the location and the movement vector of the external device.

In an example, the SSID is a first SSID, and the method may additionally include initializing, by the processing system, a secure wireless network identified by a second SSID, and receiving, by the processing system, an authentication request from a user device to access the secure wireless network. An example method may additionally include dynamically allocating, by the processing system, an internet protocol address to the user device to enable the user device to communicate via the secure network. In some example methods, the safety message is a first safety message and the location is a first location, the method further including receiving, by the processing system, a second safety message from the external device external to the vehicle; and processing, by the processing system, the second safety message to determine a second location of the external device without performing a dynamic internet protocol address allocation to the external device. An example method may additionally include alerting, by the processing system, the operator of the vehicle of the second location of the external device. An example method may additionally include identifying a message as a safety message prior to processing the safety message. In some example methods, the message is identified as a safety message based on at least one of a format of the message, a packet header of the message, a port on which the message was received, or a size of the message. In some example methods, the safety message comprises an external device identifier.

In yet another exemplary embodiment a computer program product for identifying external devices using a wireless network associated with a vehicle includes a computer readable storage medium having program instructions embodied therewith, wherein the computer readable storage medium is not a transitory signal per se, the program instructions executable by a processing device to cause the processing device to perform a method. In examples, the method includes initializing, by a processing system, an unsecure wireless network identified by a service set identifier (SSID). The method further includes receiving, by the processing system, a safety message from an external device external to a vehicle. The method further includes processing, by the processing system, the safety message to determine a location and a movement vector of the external device without performing a dynamic internet protocol address allocation to the external device. The method further includes alerting, by the processing system, an operator of the vehicle of the location and the movement vector of the external device.

In an example, the SSID is a first SSID, and the method may additionally include initializing, by the processing system, a secure wireless network identified by a second SSID, and receiving, by the processing system, an authentication request from a user device to access the secure wireless network. An example method may additionally include dynamically allocating, by the processing system, an internet protocol address to the user device to enable the user device to communicate via the secure network. In some example methods, the safety message is a first safety message and the location is a first location, the method further including receiving, by the processing system, a second safety message from the external device external to the vehicle; and processing, by the processing system, the second safety message to determine a second location of the external device without performing a dynamic internet protocol address allocation to the external device. An example method may additionally include alerting, by the processing system, the operator of the vehicle of the second location of the external device. An example method may additionally include identifying a message as a safety message prior to processing the safety message. In some example methods, the message is identified as a safety message based on at least one of a format of the message, a packet header of the message, a port on which the message was received, or a size of the message. In some example methods, the safety message comprises an external device identifier. According to some example methods, the external device is configured to detect the unsecured wireless network using the SSID; determine whether the external device should transmit to the vehicle the safety message based at least in part on a location of the external device, a movement of the external device, and a location of the vehicle that is transmitted via the SSID; connect to the unsecured wireless network; and send the safety message to the vehicle.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for utilizing multi-service set identifier wireless networks to provide multiple networks. For example, a secure network and an unsecure network may be provided. The secure network may be used to enable users to connect their devices to the wireless network (e.g., WiFi) associated with a vehicle and may similarly be used to connect in-vehicle devices, such as infotainment systems, to the in-vehicle wireless network. The unsecure network may be used to detect devices external to the vehicle and determine their identity. In this way, the driver may be alerted to the presence of nearby pedestrians, cyclists, other vehicles, and the like.

A service set identifier (SSID) is an identifier for a wireless local area network (WLAN) and is intended to be unique for a particular area. An SSID differentiates one WLAN from another. To use a particular WLAN a wireless access point is configured with an SSID and a device desiring to connect to the WLAN must use the same SSID. Multiple SSIDs may be used to enable devices to access different networks through a single access point. Different policies and functions can be assigned for each SSID, which increases the flexibility, efficiency, and security of the network infrastructure.

Figure 1:
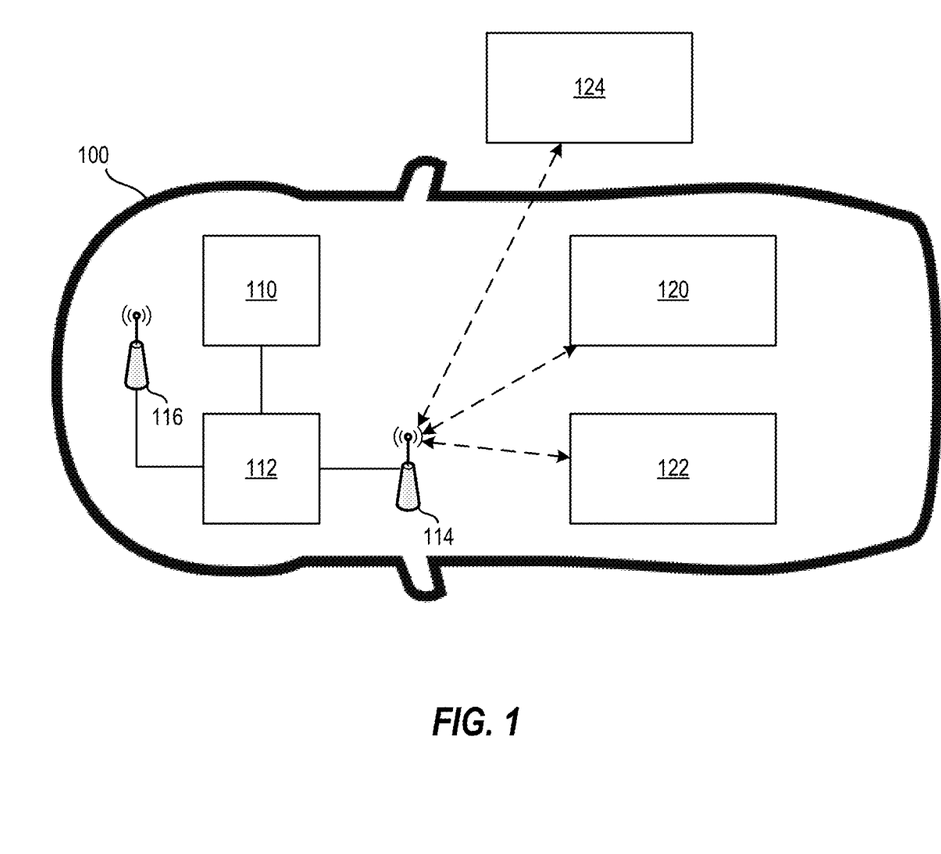
FIG. 1 illustrates a vehicle including a processing system for identifying external devices using in-vehicle multi-SSID wireless networks according to embodiments of the present disclosure.

FIG. 1 illustrates a vehicle 100 including a processing system 110 for identifying external devices using in-vehicle multi-SSID wireless networks according to embodiments of the present disclosure. In particular, the vehicle 100 may include the processing system 110, a wireless router 112, a wireless antenna 114, and a cellular antenna 116. In addition, an infotainment device 120 and a user device 122 may be present in the vehicle 110, and an external device 124 may be within a certain proximity (e.g., 25 feet, 50 feet, 100 feet, etc.) of the vehicle 100. The vehicle 100 may be a car, truck, van, bus, motorcycle, boat, plane, or another suitable vehicle 100.

The processing system 110 may be used to identify external devices, such as the external device 124, which are external to the vehicle 100. The external devices may be user devices such as smartphones, tablet computers, laptop computers, wearable computing devices (e.g., a smart watch), and the like. By identifying the external devices, the processing system 110 can alert the driver of the vehicle 100 of the presence of those nearby (e.g., pedestrians, cyclists, motorcyclists, etc.).

Figure 2:
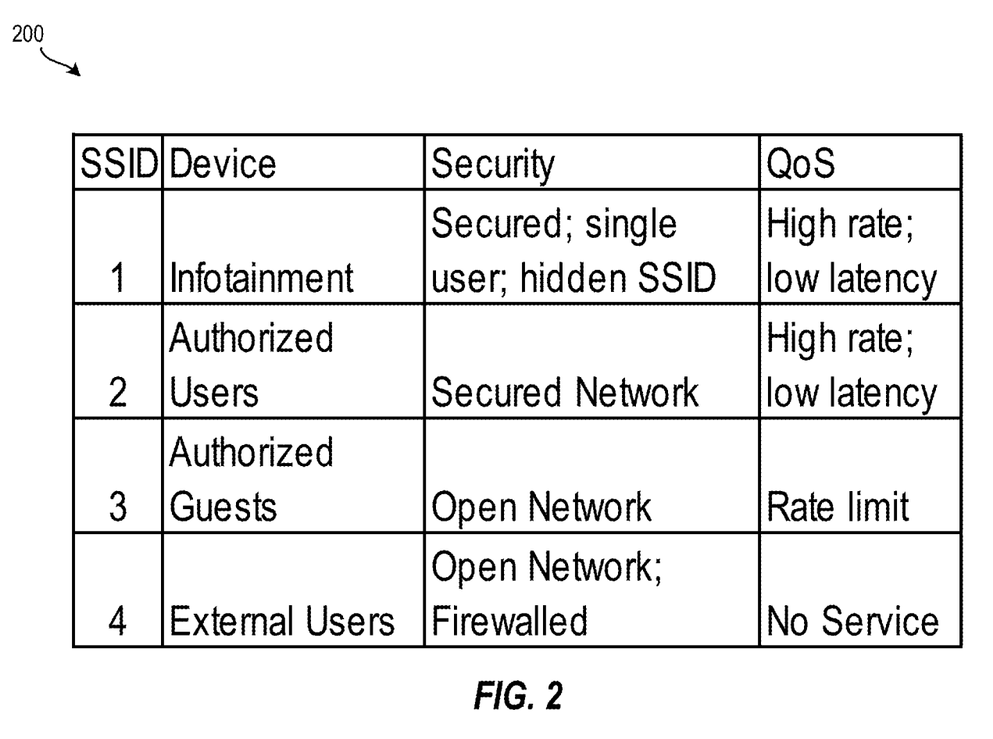
FIG. 2 illustrates a table of wireless networks according to embodiments of the present disclosure.

The processing system 110 is communicatively coupled to a wireless router 112, which initiates one or more wireless local area networks ("wireless networks"). Each network can be configured differently based on security, quality of service, and other considerations. The wireless router 112 may be any suitable networking appliance, such as a router, access point, bridge, etc. In examples, the wireless router 112 initiates four wireless networks as shown in the table 200 of FIG. 2, although fewer or more wireless networks may be implemented. In the example of FIG. 2, the four wireless networks are identified by four unique SSIDs (e.g., SSID1, SSID2, SSID3, and SSID4).

Each network is intended to be accessed by a different type of device/user and provides corresponding levels of security and quality of service. For example, the network SSID1 is intended for an infotainment device (e.g., the infotainment device 120) and provides secured access for a single infotainment device using a hidden SSID to facilitate high rate, low latency quality of service. The network SSID2 is intended for authorized users, such as a driver or regular passenger's (i.e., the driver's spouse, children, etc.). The network SSID2 provides secured access to users' devices (e.g., the user device 122) at a high rate and low latency quality of service.

The network SSID3 enables authorized guests to access an open network; however, such access may be rate limited to prevent overuse or abuse by guests. The network SSID4 provides an open, firewalled network to external users to enable the processing system 100 to identify the external user's devices. Accordingly, by identifying the external devices, the processing system 110 can alert the driver of the vehicle 100 that others may be nearby. However, the network SSID4 does not provide any service to the external devices (e.g., the external device 124).

The wireless router 112 is also communicatively coupled to a local area network wireless antenna 114 and a cellular antenna 116. The antenna 114 enables devices, such as the infotainment device 120, the user device 122, and the external device 124 to transmit data to and/or receive data from the wireless router 112. The antenna 116 enables data to be transmitted between the vehicle 110 over a cellular network or the like to a remote antenna (not shown). This may provide Internet access to the users of the wireless networks (e.g., the network SSID1, the network SSID2, and the network SSID3).

Generally, for a device to connect to a wireless network, three steps occur. First, an association or simple handshake at the media access control (MAC) level occurs between a network appliance (e.g., the wireless router 112) and the device (e.g., the infotainment device 120, the user device 122, the external device 124, etc.). After the association, an authentication occurs. The authentication includes the network appliance and the device exchanging encryption keys. This process may take several seconds or more and may cause a brief delay. Once the device is authenticated to the network, the device is assigned an internet protocol (IP) address, such as by dynamic host configuration protocol (DHCP), by the network appliance (or another suitable appliance). Again, this process may take several seconds or more and may cause an additional delay. Only after the completion of the association, authentication, and assignment phases can the device send and/or receive data. It is desirable to reduce/eliminate this delay in order to improve safety by identifying external devices using the present techniques.

By configuring a wireless network as an open network, the authentication phase can be eliminated. The IP address assignment phase can be eliminated by eliminating the need for post-association communication between the stations. To do this, the external device 124 can send location information using unidirectional communication using a device-configured static IP address that may be either randomly generated or pre-configured by the user of the external device 124. Together, this is referred to a safety message. The safety message is a unidirectional message from the external device 124 to the wireless router 112 and may be indicated by format (e.g., a UDP message), by packet header, by a specific port, by data size/length, etc.

The external device 124 executes a software application that is configured to send the safety message to the vehicle 100. The SSID(s) to which the external device 124 connects are provided as part of the installation process of the software application and may be updated thereafter, such as over the cloud or by a remote device. The software application may be a stand-alone application or may be integrated into another application. The software application configures an operating system on the external device 124 to use a static IP address, which is randomly generated by the software application or manually configured by a user of the external device 124, such as during the software application installation procedure. Even if several external devices use the same IP address, the network is not affected. The software application is also not affected because the safety message is used for identification. To ensure security, the external device 124 communicates with the wireless router 112 using a dedicated IP address (generated by the software application) and a dedicated port.

In some examples, the wireless router 112 changes the SSID to reflect its own location. According to this example, the external device 124 may determine the vehicle location and decide if it needs to update the vehicle on its location. For example, the external device 124 may determine that it is too far away from the vehicle 100 and therefore does not need to transmit its location information.

In some examples, the safety message may be authenticated using an authentication key generated by an authentication authority. For example, the vehicle may generate an authorization certificate that is transmitted via the cellular antenna 116 to the external device 124. The software application on the external device 124 receives the authentication certificate and uses it to "sign" each message that the external device 124 sends to the vehicle 100. This enables the wireless router 112 to validate the messages. In another example, a cloud application and/or a remote device application can generate the authorization certificate that is transmitted via the cellular antenna 116 to the external device 124. The software application on the external device 124 can communicate with the cloud/remote device and receive a certification that can be processed by the vehicle 100 (and any other suitable vehicle).

Figure 3:
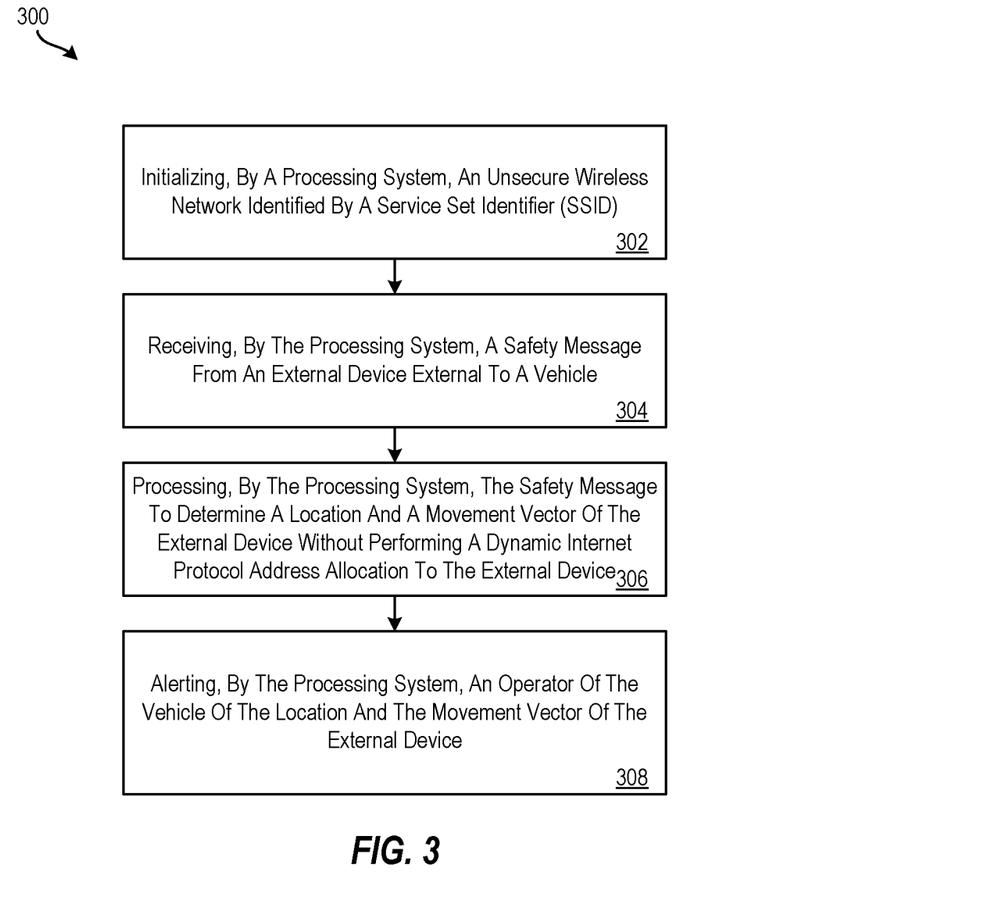
FIG. 3 illustrates a flow diagram of a method for identifying external devices using in-vehicle multi-SSID wireless networks according to aspects of the present disclosure.

FIG. 3 illustrates a flow diagram of a method 300 for identifying external devices using a wireless network associated with a vehicle according to aspects of the present disclosure. The method 300 may be implemented, for example, by the processing system 110 of FIG. 1, by the processing system 20 of FIG. 4, or by another suitable processing system or device.

At block 302, the method 300 includes initializing, by a processing system 110, an unsecure wireless network identified by an SSID. In examples, additional wireless networks may be initialized. Each wireless network may include certain security and/or quality of service settings to satisfy requirements for different devices.

At block 304, the method 300 includes receiving, by the processing system 110, a safety message from an external device external 124 to a vehicle 100.

At block 306, the method 300 includes processing, by the processing system 110, the safety message to determine a location and a movement vector of the external device 124 without performing a dynamic internet protocol address allocation to the external device 124. In some examples, the method 300 may include identifying a message as a safety message prior to processing the safety message. The message can be identified as a safety message based on certain aspects of the message such as a format of the message, a packet header of the message, a port on which the message was received, or a size of the message. A movement vector may also be received that indicates a direction of movement and an associated velocity of the movement in the direction of the movement. The safety message may include an external device identifier used to identify the external device. This is useful for tracking the movement of an external device when multiple external safety messages are received from the same device. Any messages not identified as a safety message is ignored.

At block 308, the method 300 includes alerting, by the processing system 110, an operator of the vehicle 110 of the location of the external device. The alert may be a visual, auditory, tactile, or another suitable alert, such as a blinking light, an alarm, or the like.

Additionally, the method 300 may include receiving, by the processing system 110, an authentication request from a user device (e.g., the infotainment device 120, the user device 122) to access the secure wireless network and then dynamically allocating, by the processing system 110, an internet protocol address to the user device to enable the user device to communicate via the secure network.

In some examples, the method 300 may further include receiving, by the processing system 110 an additional safety message from the external device and then processing the additional safety message to determine a second location of the external device. This enables the movement of the external devices to be determined. For example, if a pedestrian with an external device starts walking into the path of the vehicle 100, the processing system 110 may detect the movement by determining the change in the location as a result of the received first and second safety messages and alert the driver accordingly.

Additional processes also may be included, and it should be understood that the processes depicted in FIG. 3 represent illustrations and that other processes may be added or existing processes may be removed, modified, or rearranged without departing from the scope and spirit of the present disclosure.

Figure 4:
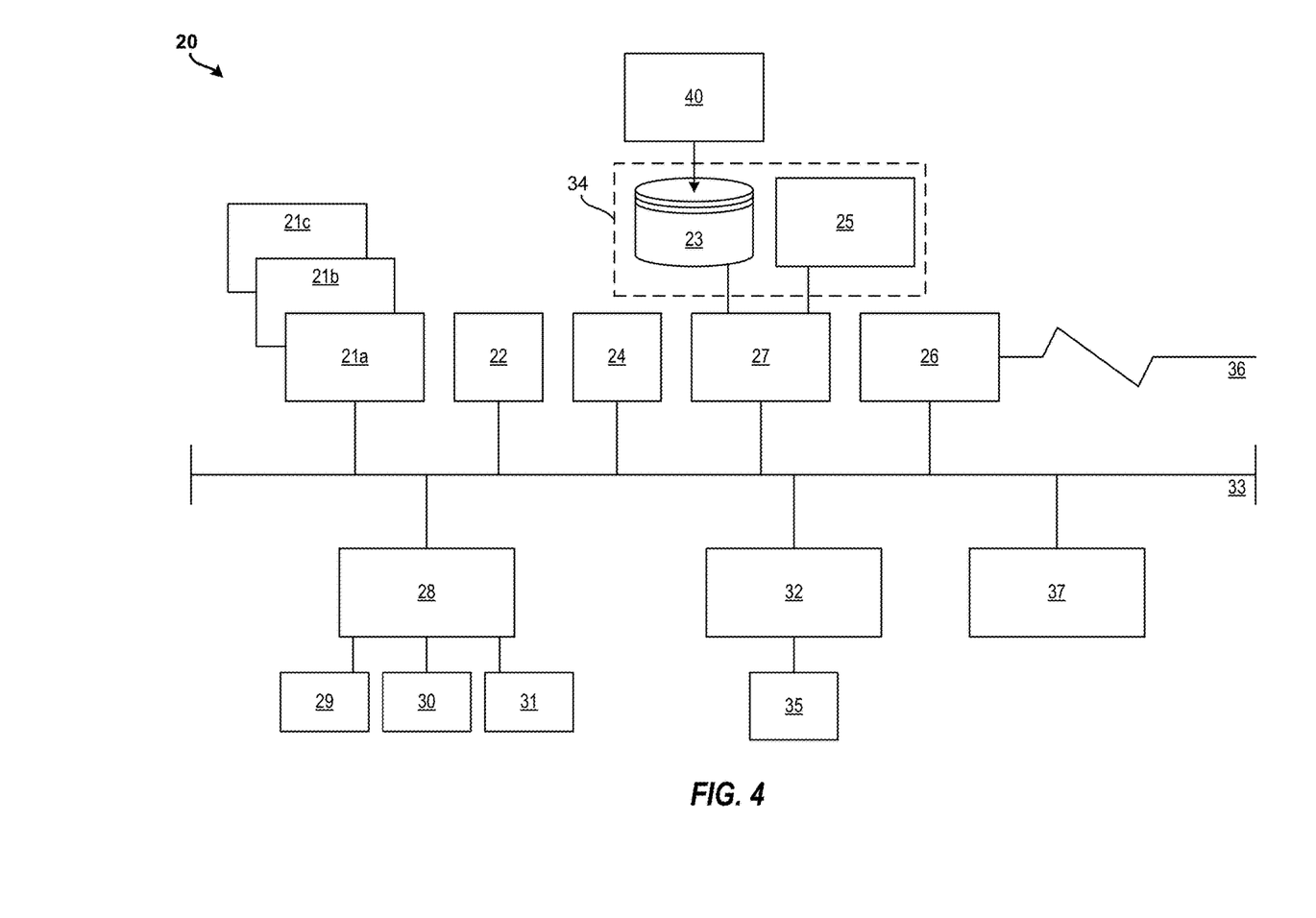
FIG. 4 illustrates a block diagram of a processing system for implementing the techniques described herein according to an exemplary embodiment.

It is understood that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a network adapter 26 coupled to system bus 33. I/O adapter 27 may be a small computer system interface (SCSI) adapter that communicates with a hard disk 23 and/or other storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 34 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for identifying external devices using a wireless network associated with a vehicle, the method comprising:
   initializing, by a processing system, an unsecure wireless network identified by a service set identifier (SSID), wherein the SSID identifying the unsecured wireless network is a first SSID, wherein the unsecured wireless network enables unidirectional communication to the vehicle from an external device external and not attached to the vehicle via a static internet protocol address determined by the external device;
   receiving, by the processing system, a safety message from the external device;
   processing, by the processing system, the safety message to determine a location and a movement vector of the external device without performing a dynamic internet protocol address allocation to the external device, wherein the movement vector indicates a direction of movement of the external device and an associated velocity of the movement in the direction of movement;
   alerting, by the processing system, an operator of the vehicle of the location and the movement vector of the external device;
   initializing, by the processing system, a secure wireless network identified by a second SSID;

receiving, by the processing system, an authentication request from a user device to access the secure wireless network; and dynamically allocating, by the processing system, an internet protocol address to the user device to enable the user device to communicate bi-directionally with the vehicle via the secure network, wherein the unsecured wireless network comprises a first security and quality of service setting, wherein the secure wireless network comprises a second security and quality of service setting that differs from the first security and quality of service setting.

2. The computer-implemented method of claim 1, wherein the safety message is a first safety message and wherein the location is a first location, the method further comprising:

receiving, by the processing system, a second safety message from the external device external to the vehicle; and processing, by the processing system, the second safety message to determine a second location of the external device without performing a dynamic internet protocol address allocation to the external device.

3. The computer-implemented method of claim 2, further comprising alerting, by the processing system, the operator of the vehicle of the second location of the external device.

4. The computer-implemented method of claim 1, further comprising identifying a message as a safety message prior to processing the safety message.

5. The computer-implemented method of claim 4, wherein the message is identified as a safety message based on at least one of a format of the message, a packet header of the message, a port on which the message was received, or a size of the message.

6. The computer-implemented method of claim 1, wherein the safety message comprises an external device identifier.

7. The computer-implemented method of claim 1, further comprising authenticating, by the processing system, the safety message using an authentication key generated by an authentication authority.

8. A system for identifying external devices using a wireless network associated with a vehicle, the system comprising:

a memory comprising computer readable instructions; and a processing device for executing the computer readable instructions for performing a method, the method comprising:

initializing, by the processing system, an unsecure wireless network identified by a service set identifier (SSID), wherein the SSID identifying the unsecured wireless network is a first SSID, wherein the unsecured wireless network enables unidirectional communication to the vehicle from an external device external to the vehicle via a static internet protocol address determined by the external device;

receiving, by the processing system, a safety message from the external device;

processing, by the processing system, the safety message to determine a location and a movement vector of the external device without performing a dynamic internet protocol address allocation to the external device, wherein the movement vector indicates a direction of movement of the external device and an associated velocity of the movement in the direction of movement;

alerting, by the processing system, an operator of the vehicle of the location and the movement vector of the external device;

initializing, by the processing system, a secure wireless network identified by a second SSID;

receiving, by the processing system, an authentication request from a user device to access the secure wireless network; and dynamically allocating, by the processing system, an internet protocol address to the user device to enable the user device to communicate bi-directionally with the vehicle via the secure network, wherein the unsecured wireless network comprises a first security and quality of service setting, wherein the secure wireless network comprises a second security and quality of service setting that differs from the first security and quality of service setting.

9. The system of claim 8, wherein the safety message is a first safety message and wherein the location is a first location, the method further comprising:

receiving, by the processing system, a second safety message from the external device external to the vehicle; and processing, by the processing system, the second safety message to determine a second location of the external device without performing a dynamic internet protocol address allocation to the external device.

10. The system of claim 9, the method further comprising alerting, by the processing system, the operator of the vehicle of the second location of the external device.

11. The system of claim 8, the method further comprising identifying a message as a safety message prior to processing the safety message.

12. The system of claim 11, wherein the message is identified as a safety message based on at least one of a format of the message, a packet header of the message, a port on which the message was received, or a size of the message.

13. The system of claim 8, wherein the safety message comprises an external device identifier.

14. A computer program product for identifying external devices using a wireless network associated with a vehicle, the computer program product comprising:

a computer readable storage medium having program instructions embodied therewith, wherein the computer readable storage medium is not a transitory signal per se, the program instructions executable by a processing device to cause the processing device to perform a method comprising:

initializing, by the processing system, an unsecure wireless network identified by a service set identifier (SSID), wherein the SSID identifying the unsecured wireless network is a first SSID, wherein the unsecured wireless network enables unidirectional communication to the vehicle from an external device external to the vehicle via a static internet protocol address determined by the external device;

receiving, by the processing system, a safety message from the external device;

processing, by the processing system, the safety message to determine a location and a movement vector of the external device without performing a dynamic internet protocol address allocation to the external device;

alerting, by the processing system, an operator of the vehicle of the location and the movement vector of the external device;

initializing, by the processing system a first secure wireless network identified by a second SSID, the first secured wireless network being secured, hidden, accessible by a single device, and having a first quality of service setting;

initializing, by the processing system a second secure wireless network identified by a third SSID, the second secured wireless network being secured, visible, accessible by multiple devices, and having a second quality of service setting; and initializing, by the processing system an open wireless network identified by a fourth SSID, the open wireless network being open and having a third quality of service setting, wherein the first unsecured wireless network is open, firewalled, and has a fourth quality of service setting, the fourth quality of service setting preventing the external device from communicating with the vehicle except for sending safety messages to the vehicle.

15. The computer program product of claim 14 further comprising:

receiving, by the processing system, an authentication request from a user device to access the first secure wireless network; and dynamically allocating, by the processing system, an internet protocol address to the user device to enable the user device to communicate via the first secure network.

16. The computer program product of claim 14, wherein the safety message is a first safety message and wherein the location is a first location, the method further comprising:

receiving, by the processing system, a second safety message from the external device external to the vehicle;

processing, by the processing system, the second safety message to determine a second location of the external device without performing a dynamic internet protocol address allocation to the external device; and alerting, by the processing system, the operator of the vehicle of the second location of the external device.

17. The computer program product of claim 14, wherein the external device is configured to:

detect the unsecured wireless network using the SSID;

determine whether the external device should transmit to the vehicle the safety message based at least in part on a location of the external device, a movement of the external device, and a location of the vehicle that is transmitted via the SSID;

connect to the unsecured wireless network; and send the safety message to the vehicle.

* * * * *